(12) United States Patent
Tuchscherer (10) Patent No.: US 9,481,438 B1
(45) Date of Patent: Nov. 1, 2016

(54) OUTBOARD MOTOR COWL ASSEMBLY USING SHAPE MEMORY ALLOY TO ACTUATE SEAL AND/OR LATCH

(71) Applicant: Brunswick Corporation, Lake Forest, IL (US)

(72) Inventor: Andrew Tuchscherer, Wauwatosa, WI (US)

(73) Assignee: Brunswick Corporation, Lake Forest, IL (US)

( * ) Notice: Subject to any disclaimer, the term of this patent is extended or adjusted under 35 U.S.C. 154(b) by 23 days.

(21) Appl. No.: 14/676,397

(22) Filed: Apr. 1, 2015

(51) Int. Cl.
    B63H 20/32        (2006.01)
    B63H 21/36        (2006.01)
    F16H 57/029       (2012.01)

(52) U.S. Cl.
     CPC ............ *B63H 20/32* (2013.01); *F16H 57/029* (2013.01); *B63H 2020/323* (2013.01)

(58) Field of Classification Search
     CPC  B63H 20/32; B63H 20/00; B63H 2020/323; F16H 57/029; F16H 57/031
     See application file for complete search history.

(56) References Cited

U.S. PATENT DOCUMENTS

| | | |
|---|---|---|
| 4,348,194 A | 9/1982 | Walsh |
| 4,600,396 A | 7/1986 | Crane et al. |
| 4,844,031 A | 7/1989 | Boda et al. |
| 4,875,883 A | 10/1989 | Slattery |
| 4,930,790 A | 6/1990 | Sheridan |
| 5,120,248 A | 6/1992 | Daleiden et al. |
| 5,487,687 A | 1/1996 | Idzikowski et al. |
| 6,662,742 B2 * | 12/2003 | Shelton .................. F16M 11/12 114/312 |
| 6,663,450 B1 | 12/2003 | Walczak et al. |
| 6,669,517 B1 | 12/2003 | Alby et al. |
| 6,682,379 B1 | 1/2004 | Walczak et al. |
| 6,972,659 B2 | 12/2005 | von Behrens et al. |
| 6,991,500 B1 | 1/2006 | Gulko et al. |
| 7,140,649 B1 | 11/2006 | Gregory |
| 7,204,472 B2 * | 4/2007 | Jones .................... F16K 15/031 251/129.06 |

(Continued)

FOREIGN PATENT DOCUMENTS

EP      2375069 A1      10/2011

OTHER PUBLICATIONS

Dynalloy, Inc., Technical Characteristics of FLEXINOL® Actuator Wires, F1114Rev 1.2, PDF copy available at http://www.dynalloy.com/pdfs/TCF1140.pdf, website visited Apr. 1, 2014.

(Continued)

*Primary Examiner* — Anthony Wiest
(74) *Attorney, Agent, or Firm* — Andrus Intellectual Property Law, LLP (57) ABSTRACT

A cowl assembly for an outboard motor includes first and second cowl members. A fastening assembly includes a latch coupled to one of the cowl members, and a retaining mechanism coupled to the other of the cowl members. The latch and the retaining mechanism engage one another to fasten the first and second cowl members together. A seal is configured to form a fluid tight joint between the cowl members. A shape memory alloy wire is coupled to at least one of the latch and the seal. A switch is configured to selectively provide electrical current to the shape memory alloy wire to activate the shape memory alloy wire. Activation of the shape memory alloy wire causes at least one of disengagement of the latch from the retaining mechanism and disengagement of the seal from one of the first and second cowl members, enabling separation of the cowl members.

16 Claims, 6 Drawing Sheets

(56) References Cited

U.S. PATENT DOCUMENTS

| | | | |
|---|---|---|---|
| 7,258,347 B2* | 8/2007 | Keefe | B60J 10/50 277/628 |
| 7,267,592 B1 | 9/2007 | Ingebritson et al. | |
| 2002/0113380 A1 | 8/2002 | Clark | |
| 2005/0150223 A1 | 7/2005 | Rey et al. | |
| 2013/0011806 A1 | 1/2013 | Gao et al. | |

OTHER PUBLICATIONS

Shape Memory Alloy Shape Training Tutorial, Mechanical Engineering Lab, Dec. 9, 2004, PDF copy available at http://www-personal.umich.edu/~btrease/share/SMA-Shape-Training-Tutorial.pdf.

* cited by examiner

OUTBOARD MOTOR COWL ASSEMBLY USING SHAPE MEMORY ALLOY TO ACTUATE SEAL AND/OR LATCH

FIELD

The present disclosure relates to cowls for outboard motors, and more specifically to latches and seals provided for such cowls.

BACKGROUND

U.S. Pat. No. 4,348,194, hereby incorporated by reference herein, discloses a cowl for the power head of an outboard motor including two bottom cowl members attached together by screws which also mount a latch bracket and a hinge member. The latch bracket supports a latch mechanism which, with the hinge member, serves to hold a top cowl member in place.

U.S. Pat. No. 4,600,396, hereby incorporated by reference herein, discloses a latch for the cowl of an outboard motor engine including a catch mounted on one of the cowl members. A lever is pivotally attached to the other cowl member and a resilient spring member is pivotally attached to the lever. The lever and spring member act to provide an overcenter action on the lever when the latch is closed. The lever includes a shield to conceal the latch assembly.

U.S. Pat. No. 4,875,883, hereby incorporated by reference herein, discloses a cowl assembly for an outboard motor, including an upper cowl section and a lower cowl section, that is provided with an improved latch assembly. The latch assembly incorporates a pivotable hook connected to one of the cowl sections, which is engageable with a hook-engaging member provided on a catch mechanism connected to the other cowl section. Due to the presence of a compressible seal between the upper and lower cowl sections, relative vertical movement is possible therebetween, and thereby between the hook and the hook-engaging member. The improved latch mechanism incorporates a retainer mechanism for preventing disengagement of the hook from the catch mechanism during such relative vertical movement of the cowl sections, for ensuring that the cowl sections remain secured together during compression of the compressible seal between the cowl sections.

U.S. Pat. No. 4,930,790, hereby incorporated by reference herein, discloses a seal structure for placement at the joint between first and second cowl sections, which forms a seal between the cowl sections at two distinct locations. A resilient seal is formed at each sealing location, with one of the resilient seals being provided by a composite sealing construction. A flexible sealing strip for placement at the joint includes portions which form a pocket disposed between facing surfaces of the cowl sections, and a resilient cord placed within the pocket around the periphery of the joint. The pocket forming portions of the sealing strip can be moved to an open position so as to allow the strip to be satisfactorily stapled or otherwise connected to one of the cowl sections, as well as to allow placement of the cord within the pocket. The second resilient seal is provided by an enclosed air space disposed between another set of facing surfaces provided on the cowl sections.

U.S. Pat. No. 6,669,517, hereby incorporated by reference herein, discloses a cowl structure comprising first and second cowl members that are independent components. A first cowl member is attachable, by a latch mechanism, to a support structure of the outboard motor. The second cowl member is attachable, by a latch mechanism, to both the first cowl member and the support structure. The first cowl member extends across a rear portion of the outboard motor and at least partially along both port and starboard sides of the outboard motor. The second cowl member extends across a front portion of the outboard motor and at least partially along the port and starboard sides of the outboard motor. In a preferred embodiment, the second cowl member also extends partially over a top portion of the outboard motor and over a rear portion of the outboard motor.

U.S. Pat. No. 6,991,500, hereby incorporated by reference herein, discloses a cowl latching system that facilitates the installation of a removable cowl with respect to a stationary cowl structure and allows these two components to be locked together as a result of a simple downward movement in a vertical direction of the removable cowl with respect to the stationary structure. Removal of the removable cowl is also facilitated by allowing these components to be disengaged from each other as a result of a rotation of the removable cowl relative to the stationary cowl structure after a manually operable latch is released.

U.S. Pat. No. 7,267,592, hereby incorporated by reference herein, discloses a latch mechanism for a cowl of an outboard motor including a handle and retaining mechanism for the handle which define a detent position when the handle is in a latching or closed position. A protrusion of the handle rotates in a plane which places it between a roller and a metallic ball when the handle is in a latching position. The metallic ball is shaped to be received in a groove formed in the protrusion in order to define the detent position when the handle is in its latched position.

SUMMARY

This Summary is provided to introduce a selection of concepts that are further described below in the Detailed Description. This Summary is not intended to identify key or essential features of the claimed subject matter, nor is it intended to be used as an aid in limiting the scope of the claimed subject matter.

In one example of the present disclosure, a cowl assembly for an outboard motor includes first and second cowl members configured to be joined together proximate respective first and second mating edges thereof. A fastening assembly includes a latch coupled to one of the first and second cowl members, and a retaining mechanism coupled to the other of the first and second cowl members. The latch and the retaining mechanism are configured to engage one another so as to fasten the first and second cowl members together. A seal is coupled to one of the first and second cowl members and configured to form a fluid tight joint between the first and second cowl members. At least one shape memory alloy wire is coupled to at least one of the latch and the seal. A switch is configured to selectively provide electrical current to the at least one shape memory alloy wire so as to activate the at least one shape memory alloy wire. Activation of the at least one shape memory alloy wire causes at least one of disengagement of the latch from the retaining mechanism and disengagement of the seal from the other of the first and second cowl members, so as to enable separation of the first cowl member from the second cowl member.

According to another example of the present disclosure, a cowl assembly for an outboard motor including first and second cowl members configured to be joined together proximate respective first and second mating edges thereof is disclosed. The first mating edge has a relatively smaller perimeter than the second mating edge, such that the second mating edge overlaps the first mating edge. A seal is coupled around the entire perimeter of the first mating edge and is configured to form a fluid tight joint between the first and second cowl members. A shape memory alloy wire is coupled to, or molded within, the seal and a switch is configured to selectively provide electrical current through the shape memory alloy wire so as to activate the shape memory alloy wire. When no electrical current is provided through the shape memory alloy wire, an outer lip of the seal extends radially outwardly from the first mating edge and engages the second cowl member proximate the overlapping second mating edge so as to seal a gap between the first mating edge and the second cowl member. When electrical current is provided through the shape memory alloy wire, the shape memory alloy wire contracts, thereby pulling the outer lip of the seal radially inwardly and out of engagement with the second cowl member.

BRIEF DESCRIPTION OF THE DRAWINGS

The present disclosure is described with reference to the following Figures. The same numbers are used throughout the Figures to reference like features and like components.

DETAILED DESCRIPTION

In the present description, certain terms have been used for brevity, clarity and understanding. No unnecessary limitations are to be inferred therefrom beyond the requirement of the prior art because such terms are used for descriptive purposes only and are intended to be broadly construed.

Figure 1:
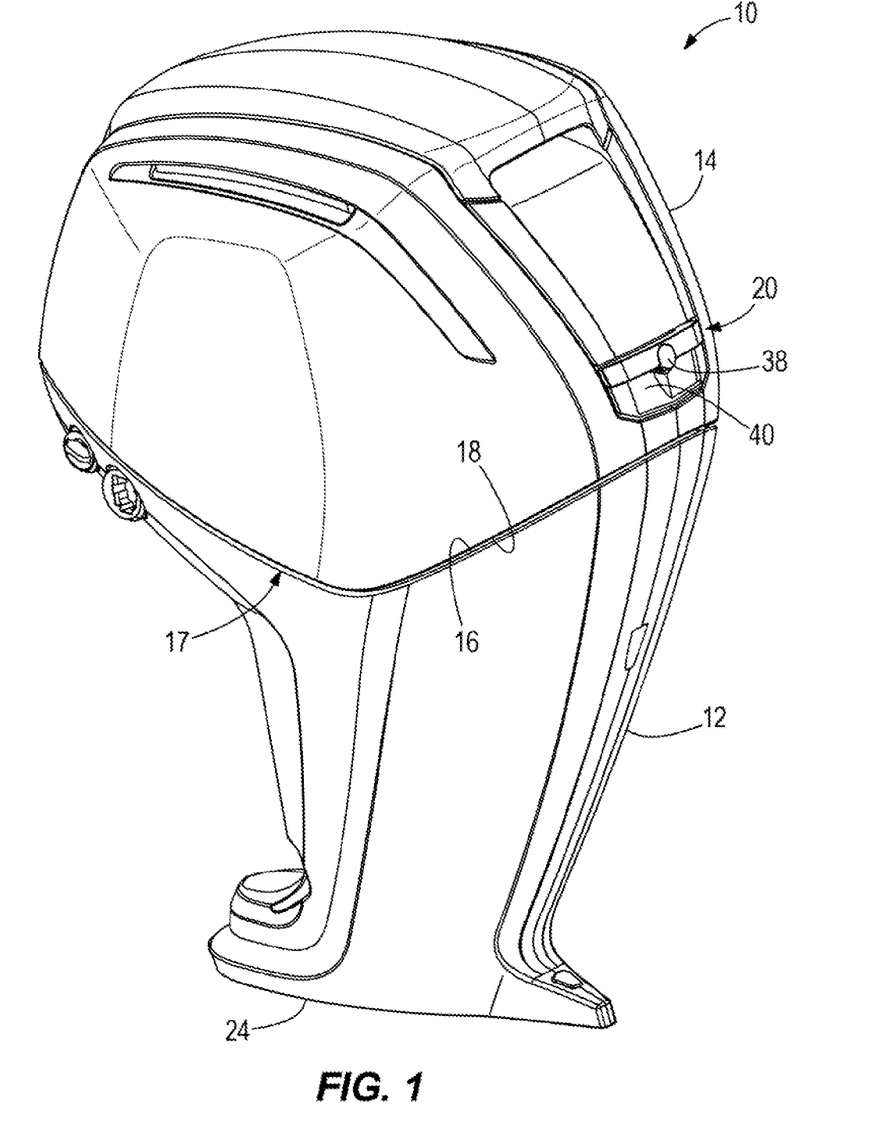
FIG. 1 illustrates an example of a cowl assembly for an outboard motor according the present disclosure.

FIG. 1 illustrates a cowl assembly 10 for an outboard motor. The cowl assembly 10 comprises a first cowl member 12 and a second cowl member 14. In the example shown, the first cowl member 12 is a bottom cowl member and the second cowl member 14 is a top cowl member. However, it should be understood that the cowl members could also be starboard and port side cowl members, arranged in a clamshell configuration, for example as disclosed in U.S. Pat. No. 4,600,396, which was incorporated by reference above. Additionally, it should be noted that the shapes of the cowl members 12, 14 and the configuration of the joint 17 between the two can be different than that shown, such as for example as disclosed in U.S. Pat. No. 6,669,517, which was incorporated by reference above. It should also be understood that more than two cowl members could be provided and connected to one another at more than one joint. Thus, the orientation, shape, connection, and number of cowl members is not limiting on the scope of the present disclosure, and the concepts discussed herein are equally applicable to many different types and configurations of cowls.

The first and second cowl members 12, 14 are configured to be joined together proximate respective first and second mating edges 16, 18 thereof, i.e., at joint 17. More specifically, with reference to FIGS. 2 and 3, the first cowl member 12 has an upper rim that serves as the first mating edge 16, while the second cowl member 14 has a lower rim that serves as the second mating edge 18. Referring to each of FIGS. 1-3, the cowl assembly 10 also includes a fastening assembly 20 and a seal 22, both of which will be described further herein below.

Referring again to FIG. 1, those having ordinary skill in the art will understand that the first and second cowl members 12, 14 are configured to enclose several components of an outboard motor. More specifically, the second cowl member 14 encloses a majority of an internal combustion engine that powers the outboard motor, while the first cowl member 12 encloses much of the driveshaft, exhaust system, and other related components of the outboard motor. The first cowl member 12 is sometimes referred to as the "chaps", and has a lower end 24 that is configured to be attached to a gearcase and thereby coupled to a propeller.

Figure 2:
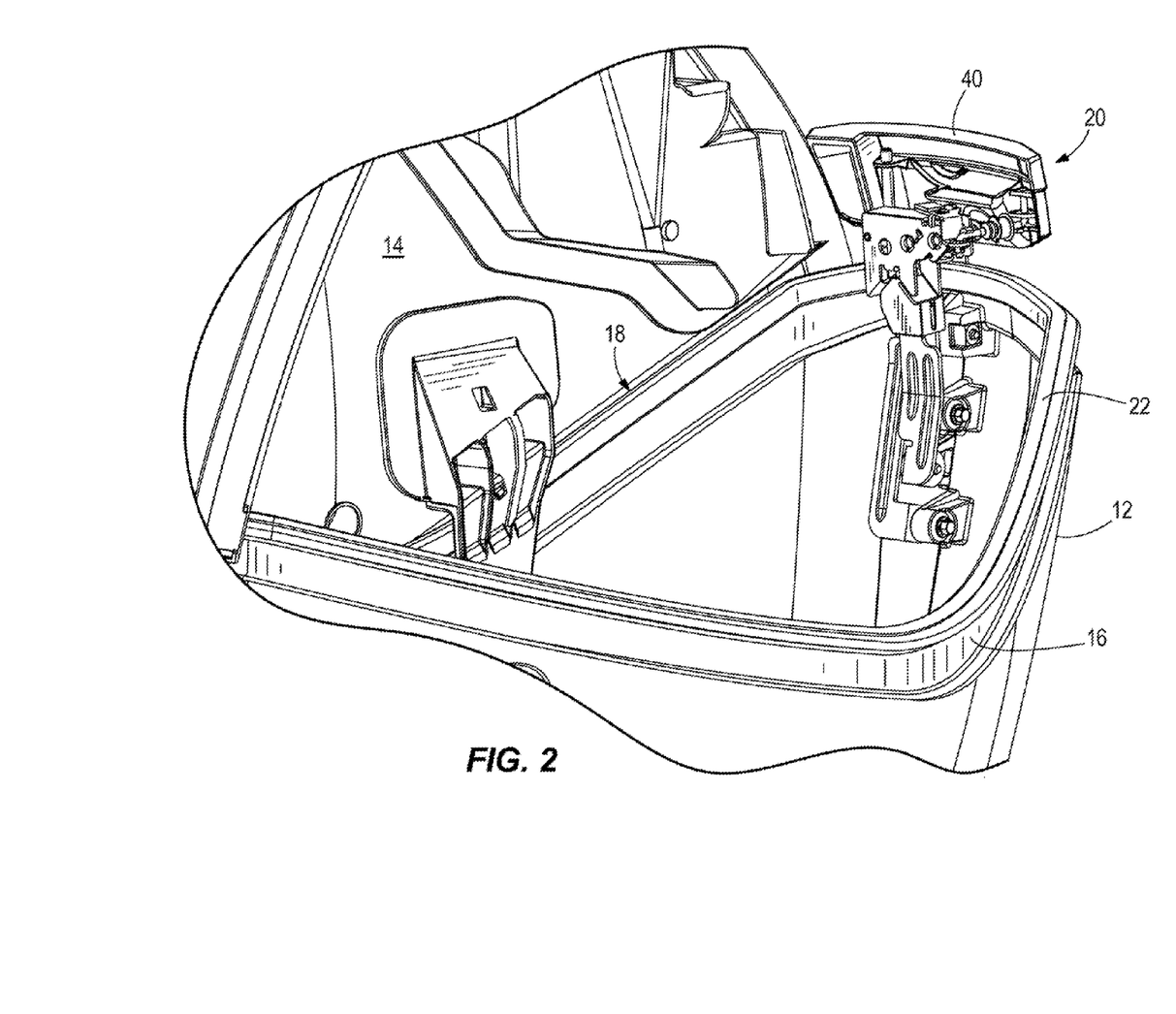
FIG. 2 illustrates a partially cut away view of the cowl assembly of FIG. 1, showing a seal between first and second cowl members.
Figure 3:
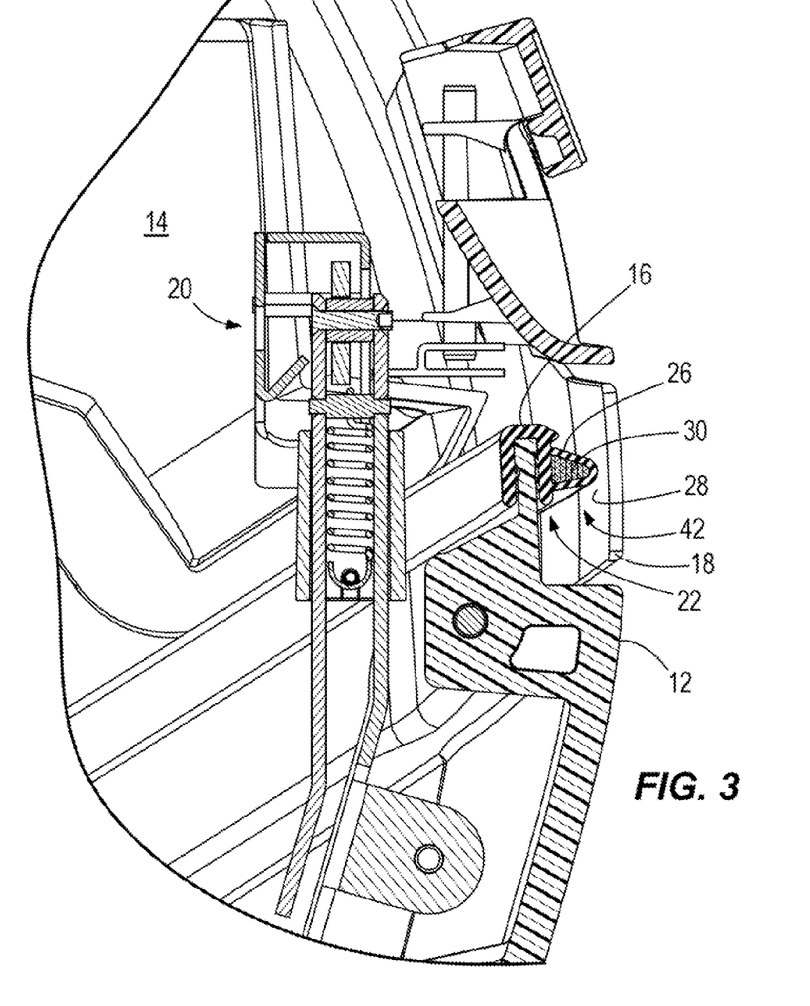
FIG. 3 illustrates a cross-sectional view of the seal shown in FIG. 2.

Referring now to FIGS. 2 and 3, one example of a seal 22 according to the present disclosure will be described. The seal 22 is coupled to one of the first and second cowl members 12, 14 and is configured to form a fluid tight joint 17 between the first and second cowl members 12, 14. In the example shown, the seal 22 is coupled to the first cowl member 12. More specifically, the seal 22 is formed in part as an inverted U-shape that fits over the rim forming the first mating edge 16 of the first cowl member 12. The inverted U-shaped portion of the seal 22 may serve as a cap that fits over either side of the rim comprising the first mating edge 16. As shown in FIG. 2, the seal 22 may be coupled around the entire perimeter of the first mating edge 16. As shown in FIG. 3, in one example, the first mating edge 16 may have a relatively smaller perimeter than the second mating edge 18 (but still with the same general perimetral shape), such that the second mating edge 18 overlaps the first mating edge 16 around the perimeter of the first mating edge 16. The seal 22 may also include an outer lip 26 projecting outwardly from the inverted U-shape of the seal 22. The outer lip 26 projects radially outwardly from where the U-shape of the seal 22 seals against the perimeter of the first mating edge 16. At its most radially outward point, the outer lip 26 contacts an inside surface 28 of the second cowl member 14 proximate the second mating edge 18, thereby providing a fluid tight seal between the first and second cowl members 12, 14.

The seal 22 may be made of any type of flexible material, such as rubber or another elastomeric material. The seal 22 may be somewhat compressible such that it provides a tight fit between the two cowl members 12, 14. The thickness, cross sectional shape, and perimetral shape of the seal 22 may be adjusted to best suit the perimetral shape of the first and second mating edges 16, 18 and the size and configuration of their rims. In other words, the concepts discussed herein are applicable to many seals other than those having the specific configuration shown and described herein.

Figure 4:
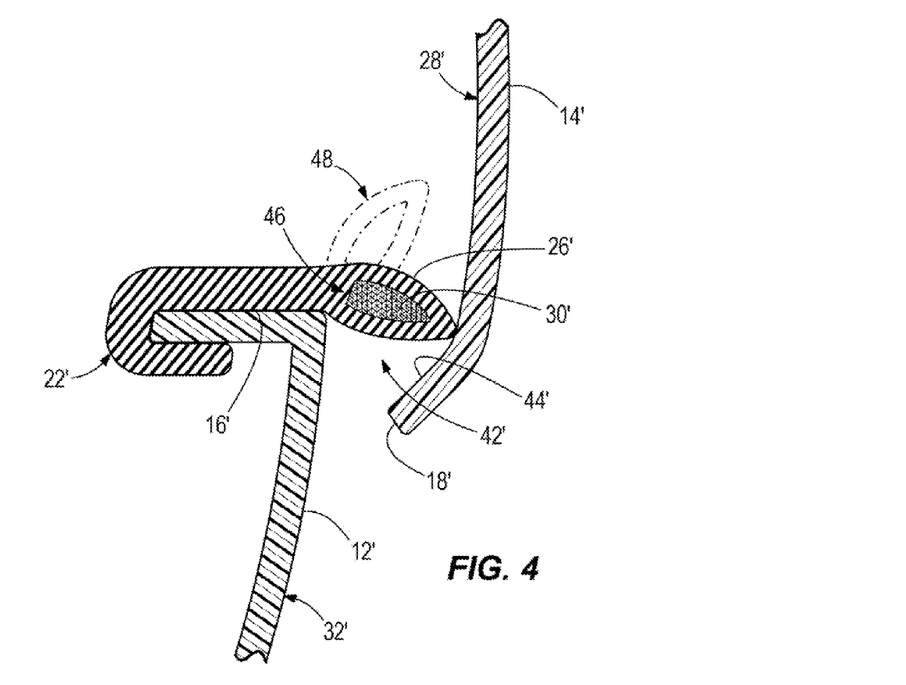
FIG. 4 illustrates another example of a seal and first and second cowl members according to the present disclosure.

In one example, a shape memory alloy (SMA) wire 30 is coupled to the seal 22. For example, the SMA wire 30 may be embedded in and coextensive with the outer lip 26 of the seal 22. The SMA wire 30 can, for example, be molded into the seal 22 as part of the process of making the seal 22. Alternatively, the SMA wire 30 can be inserted into a passageway created inside the outer lip 26 of the seal 22 during molding or extrusion of the seal 22, after such molding or extrusion is complete. The cross-sectional shape of the SMA wire 30 may be of that of an oval as shown in FIG. 3, or that of a teardrop, as shown in FIG. 4. The SMA wire 30 may have many other cross-sectional shapes, such as a flat strip, a rectangle, a circle, a polygon, etc.

Shape memory alloys are alloys that are typically made of copper-aluminum-nickel or nickel-titanium, although various other alloys can also be used. Shape memory alloys are smart materials that can change their shape, strength, and/or stiffness when activated by heat, stress, a magnetic field, or an electrical voltage. Shape memory alloys can also be trained to remember a particular shape and return to it when deactivated (i.e. when the heat, stress, magnetic field, or electrical voltage is turned off or removed). This behavior is achievable due to the mechanical properties of shape memory alloys, which can be trained using two-way shape memory training to switch between two different shapes as they are heated and cooled. For example, a SMA wire may have a first shape at a first temperature, and may change to a second shape at a second, higher temperature. Upon subsequent cooling to the first temperature, the SMA wire may change back to the first shape, without application of an external force. This is in contrast to a one-way SMA, which can be deformed due to an external force, and then heated in order to return to its original shape.

Now referring to FIG. 4, one example of an application of the shape changing properties of the SMA wire will be described with reference to another embodiment of first and second cowl members 12', 14'. Similar to the embodiment shown in FIGS. 1-3, the first cowl member 12' has first mating edge 16' and the second cowl member 14' has second mating edge 18'. In the example of FIG. 4, however, the first mating edge 16' is a rim that extends radially inwardly. The seal 22' has a corresponding C-shape that fits around this rim and is held in place for example by gluing or ribbing. The upper portion of the C-shape extends beyond an outer surface 32' of the first cowl member 12' to form a radially outwardly extending lip 26'. As shown in full lines (position 46), the outer lip 26' is wide enough to span a gap 42' between the outer surface 32' of the first cowl member 12' and the inside surface 28' of the second cowl member 14', thereby providing a fluid tight seal between the two cowl members. In one example, the position 46 of the outer lip 26' shown in full lines is a result of a first trained shape of the SMA wire 30'. However, as discussed above, the SMA wire 30' can be heated above a certain temperature to cause it change to a second trained shape. In one example, the second trained shape of the SMA wire 30' may be a contracted version of the first trained shape. When heated, as the SMA wire 30' contracts along its entire length, it will cause the flexible outer lip 26' in which it is embedded to draw together in a noose-like manner. The outer lip 26' of the seal 22' will therefore move to the position 48 shown in dashed lines as the SMA wire 30' is activated, because as the SMA wire 30' contracts to its second trained shape, it pulls the outer lip 26' inwardly and upwardly.

Similarly, although this position is not shown herein, the seal 22 of FIGS. 2 and 3 can be pulled inwardly as the SMA wire 30 in its outer lip 26 contracts. The remainder of the explanation of the embodiment shown in FIG. 4 also applies equally to the embodiment shown in FIGS. 2 and 3.

Figure 5:
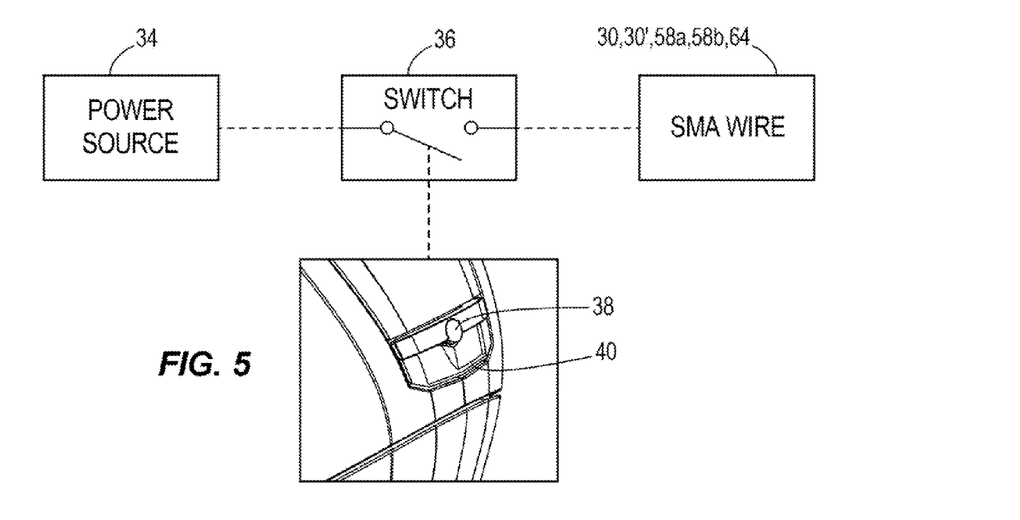
FIG. 5 is a schematic illustration of one example of a connection between a power source, a switch, a button, and a shape memory alloy wire.

Referring to FIG. 5, one example of a way in which temperatures above the activation temperature may be provided is by passing an electrical current through the shape memory alloy wire, thereby producing heat due to the natural resistance of the SMA wire (resistive heating). For example, a power source 34 such as a battery may be provided on the outboard motor or elsewhere aboard a marine vessel to which the outboard motor is coupled. The power source 34 may be electrically connected to the SMA wire 30, 30' via a switch 36. The switch 36 is configured to selectively provide electrical current through the SMA wire 30, 30' so as to activate the SMA wire 30, 30' and cause it to change to its high-temperature learned shape. The switch 36 could take many forms, but in the example provided, comprises an electromechanical switch that is closed upon pushing of a button 38. In one example, the button 38 is provided on or near an actuating mechanism 40 that can be used to actuate the fastening assembly 20, such as a lever or handle. When the button 38 is pressed, the switch 36 closes and makes an electrical connection between the power source 34 and the SMA wire 30, 30'. Electrical current may then flow through the conductive SMA wire 30, 30'. The current may continue to flow as long as the button 38 is pressed, for a predetermined period of time after the button 38 is pressed, until the button 38 is again pressed to open the switch 36, or for as long as is desirable according to the programming of the system. It should be understood that although such connection is not shown herein, in order for current to run through the SMA wire, the SMA wire is either connected in a loop with itself, connected to a current-carrying wire in a complete electrical circuit, and/or connected to ground.

Returning to the examples of FIGS. 3 and 4, when no current is provided through the SMA wire 30, 30' the outer lip 26, 26' of the seal 22, 22' extends radially outwardly from the first mating edge 16, 16' and engages the second cowl member 14, 14' proximate the overlapping second mating edge 18, 18' so as to seal a gap 42, 42' between the first mating edge 16, 16' and the second cowl member 14, 14'. In this example, this is the deactivated, low-temperature learned shape of the SMA wire, as described above. However, when the switch 36 is closed, the SMA wire 30, 30' contracts to its activated, high-temperature learned shape. In other words, when current is provided through the SMA wire 30, 30', the wire produces resistive heat, and contracts to its high-temperature learned shape, thereby pulling the outer lip 26, 26' of the seal 22, 22' radially inwardly and out of engagement with the second cowl member 14, 14' (see position 48, FIG. 4).

In this position, with the SMA wire 30, 30' contracted and the outer lip 26, 26' disengaged from the inside surface 28, 28' of the second cowl member 14, 14', the gap 42, 42' between the first and second cowl members 12, 14 is no longer closed. The second cowl member 14, 14' can therefore be removed from the first cowl member 12, 12' without any contact of the outer lip 26, 26' with the inside surface 28, 28' of the second cowl member 14, 14'. This greatly reduces wear on the seal, which is therefore is able to maintain its integrity for a longer period of time than it would were it to be rubbed along the inner surface of the upper cowl member each time the cowl members are disconnected from one another.

Additionally, activating the SMA wire to pull the outer lip 26, 26' of the seal radially inwardly allows for re-placement of the second mating edge 18, 18' over the first mating edge 16, 16' without interference between the outer lip 26, 26' of the seal and the second mating edge 18, 18'. Therefore the first and second cowl members, and more specifically their first and second mating edges, respectively, can be manufactured with greater tolerances than currently allowed. This is because the second mating edge 18, 18' does not need to have exactly the same size, shape, and alignment as the first mating edge 16, 16', as it would need to have with a vertically clamped seal. Additionally, the second cowl member does not need to overlap the first cowl member by an exact specific distance so that a non-moveable seal would contact the inside surface of the wider cowl member. Such increased tolerances result in quicker and less expensive manufacturing of the cowl assembly 10.

Additionally, referring again to FIG. 4, the fact that the second cowl member 14' can be made wider than the first cowl member 12' by a greater distance than previously allowed (see gap 423 means that an additional undercut angle 44' can be provided along the second mating edge 18' of the second cowl member 14'. This allows for protection of the seal 22' from the elements, as well as provides a surface against which the seal 22' can clamp as it returns to its expanded state upon deactivation of the SMA wire 30'.

The above-described SMA wire-activated sealing system provides for radial cowl seal arrangements (as opposed to vertically clamped seals); better sealing due to clamp loads of the seal against the inner surface of the cowl as the SMA wire is activated to its expanded position; and easier cowl installation and reduced seal wear during placement or removal of one cowl piece with respect to the other, because the seal may be moved radially inwardly by contraction of the SMA wire.

There are other ways of accomplishing movement of the seal into and out of engagement with one of the cowl members other than that described above. For instance, in FIG. 4, the unheated state of the SMA wire 30' is shown at position 46, while the heated state in shown in dashed lines at position 48. However, it should be understood that these states could be switched, such that the unheated shape of the shape memory alloy wire is the contracted shape shown at position 48. However, this would require application of heat, current, or the like to the SMA wire to keep the seal extended across the gap (i.e., to maintain the expanded, heated shape), rather than requiring heat, current or the like merely to retract the seal momentarily. Additionally, it should be noted that the SMA wire 30, 30' may be developed such that it not only contracts when heated, but also curls inwardly upon itself, thereby providing even more radially inwardly directed application of force to the outer lip 26, 26' of the seal 22, 22'. Cross sectional shapes of a rectangle, teardrop, oval or other oblong shape would allow such curling in of the wire upon itself toward the center of the cowl. Further, the outer lip 26, 26' of the seal 22, 22' could be made to move downwardly upon contraction of the SMA wire 30, 30', rather than upwardly as shown herein.

In either the example of FIG. 3 or 4, the SMA wire need not be embedded in the lip of the seal. Instead, multiple SMA wires could be coupled to the lip in several different places around its perimeter, with opposite ends of the wires connected to the inner surface of the first cowl member 12. The wires, as they contract, could pull the lip radially inwardly, thereby accomplishing the same effect as that described above. As another alternative, the second cowl member 14 could be provided with the seal 22 attached thereto, and the seal 22 could be held in an upwardly slanting position by the first trained shape of the SMA wire, and moved radially inwardly and downwardly by expansion of the SMA wire to its second trained shape by heating. This movement would cause the seal to flap downwardly onto the rim of the first mating edge 16 of the first cowl member 12.

Figure 6:
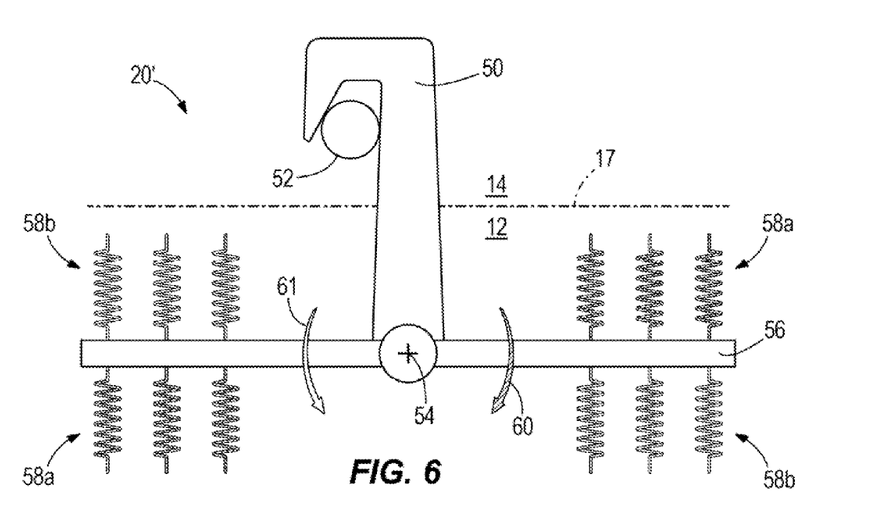
FIG. 6 illustrates one example of a fastening assembly according to the present disclosure.

Now turning to FIG. 6, one example in which a shape memory alloy wire may be used to actuate a fastening assembly 20' will be described. The elements in FIG. 6 are shown very schematically, and it should be understood that the principles described herein apply to many different types of latches. The fastening assembly 20' comprises a latch 50 that is coupled to one of the first and second cowl members, here, the first cowl member 12. The fastening assembly 20' also includes a retaining mechanism 52 that is coupled to the other of the first and second cowl members, here, the second cowl member 14. In the example shown, the retaining mechanism 52 comprises a pin around which the hook of the latch 50 fits. The latch 50 can be coupled to the first cowl member 12 by way of a pivot pin 54, which may be directly coupled to and/or extend from the inner or outer surface of the first cowl member 12. The pivot pin 54 and latch 50 can also be connected to a generally horizontally extending rod 56, which pivots around the pivot pin 54. The rod 56 has a plurality of shape memory alloy wires connected to it. As shown, the shape memory alloy wires are divided into two groups, 58a and 58b, and half of each group is attached to an opposite side and an opposite end of the rod 56 (i.e. kitty corner).

The latch 50 and the retaining mechanism 52 are configured to engage one another, such as shown by the hooked end of latch 50 engaging the retaining mechanism 52, so as to fasten the first and second cowl members 12, 14 together across the joint 17 between them. A switch 36 (see FIG. 5) is configured to selectively provide electrical current from a power source 34 to the groups of shape memory alloy wires 58a, 58b so as to activate the groups of SMA wires 58a, 58b. Activation of the groups of SMA wires causes disengagement of the latch 50 from the retaining mechanism 52 so as to enable separation of the first cowl member 12 from the second cowl member 14.

For example, in FIG. 6, a first end of each shape memory alloy wire in each group is coupled to the latch 50 via the rod 56, and a second, opposite end of each shape memory alloy wire is coupled to, for example, an inner surface of the first cowl member 12. Alternatively, the second, opposite ends of the wires could be coupled to a housing or similar structure provided on the inner or outer surface of the first cowl member 12. In the example shown in FIG. 6, the shape memory alloy wires in both groups 58a, 58b are wound into coil spring form. This allows the SMA wires to force the rod 56 back to its initial position when the shape memory alloy wires are deactivated. In one example, when the groups of SMA wires 58a are provided with current, the spring form expand (i.e. get longer) such that the rod 56 is rotated around the pivot pin 54 in a clockwise direction as shown by arrow 60. At the same time, the groups of SMA wires 58b may also be provided with current, but this current may cause them to contract, thereby providing even more force to rotate the rod 56 in the direction of arrow 60. This would cause the latch 50 to disengage from the retaining mechanism 52 such that the first and second cowl members 12, 14 can be separated. Alternatively, provision of current to the groups of SMA wires 58a may cause them to contract and provision of current to the groups 58b may cause them to expand, thereby causing the rod 56 to rotate in an opposite direction as shown by arrow 61 (counterclockwise). This would cause the latch 50 to engage with the retaining mechanism 52, thereby fastening the cowl members 12, 14 together.

In yet another example, different types of SMA wires are provided within each group 58a, 58b such that provision of current through these different types of wires can be used to both latch and unlatch the fastening assembly 20'. For example, some of the SMA wires in each of groups 58a and 58b can be made to expand when heated, while others within each group can be made to contract when heated. By separate electrical wiring to the different types of wires in each group, both clockwise and counterclockwise rotation of the rod 56 can be accomplished. In yet another example, the unheated or un-energized state of all the wires is one that results in the latched position of the fastening assembly, and provision of electrical current can cause the assembly to move to the unlatched position for a short period of time during removal or replacement of the cowl members with respect to one another.

Figure 7:
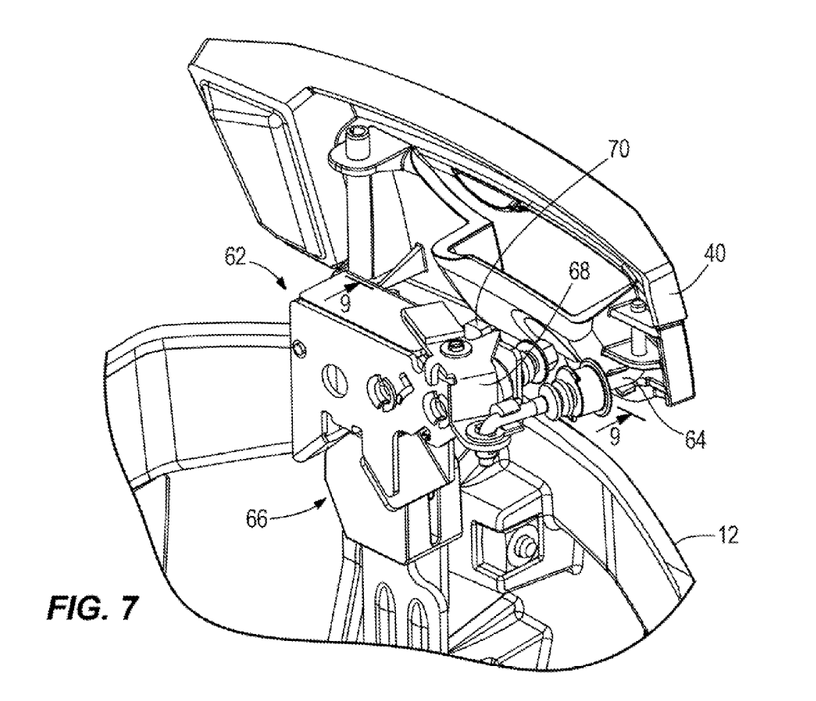
FIG. 7 illustrates another example of a fastening assembly according to the present disclosure.
Figure 8:
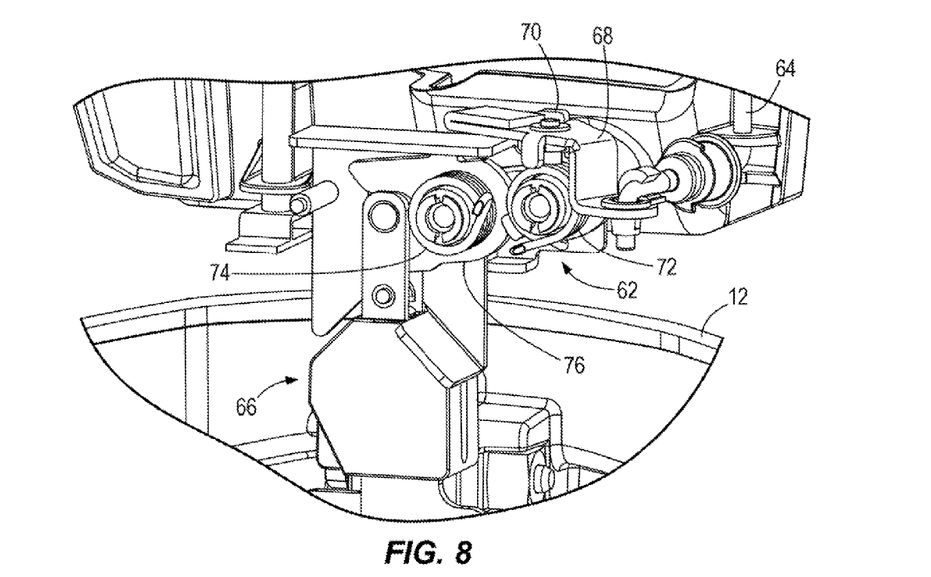
FIG. 8 illustrates a view of the fastening assembly of FIG. 7, with portions of the fastening assembly removed to show internal structure.
Figure 9:
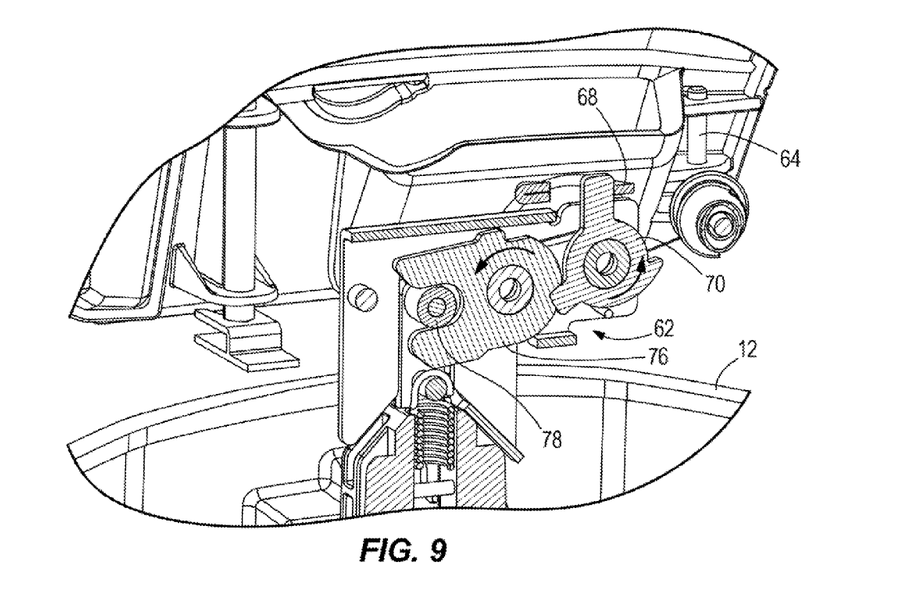
FIG. 9 illustrates the fastening assembly of FIGS. 7 and 8, with additional portions of the fastening assembly removed to show internal structure.

Now turning to FIGS. 7-9, another example of a fastening assembly 20 (see also FIG. 2) will be described. As shown in FIG. 7, a SMA wire 64 may be attached to the actuating mechanism 40 located on the second cowl member 14 (see also FIGS. 1 and 5). Although this connection is not shown in FIG. 7, it should be understood that the button 38 shown in FIGS. 1 and 5 can be used to close a switch 36 and provide electrical current to the SMA wire 64, as described with respect to FIG. 5. Upon provision of current to the SMA wire 64, the SMA wire 64 may either expand or contract as it is activated so as to actuate the fastening assembly 20 and disengage the latch 62, coupled to the second cowl member 14 via the actuating mechanism 40, from a retaining mechanism 66 coupled to the inner surface of the first cowl member 12. In the example shown in FIGS. 7-9, provision of electrical current through the SMA wire 64 causes it to contract, and thereby to pull on a rotating cam actuator 68. Rotation of cam actuator 68 causes cam 70 to rotate in a counterclockwise direction, as shown in FIG. 9. Counteraction of springs 72, 74 (FIG. 8) thereafter causes striker 76 to rotate counterclockwise as well (FIG. 9). This causes pin 78 of retaining mechanism 66 to disengage, and the first and second cowl members 12, 14 can be separated.

It should be understood that many different types of fastening assemblies could be provided besides the two described herein, such as the fastening assemblies described in the patents that were incorporated by reference herein above. Additionally, as described with respect to FIG. 6, it should be understood that any of the fastening assemblies could be provided with shape memory alloy wires that, when activated, can cause the latch and the retaining mechanism to engage and/or disengage one another, not merely to disengage.

Additionally, according to the present disclosure, either the SMA-actuated latch or the SMA-actuated seal may be provided, or both. If only the seal is SMA-actuated, the latch may be a conventional latch that is mechanically actuated. If only the latch is SMA-actuated, the seal may be a conventional one. If both the latch and the seal are actuated by shape memory alloy wire, the same shape memory alloy wire could be routed to both the latch and the seal, or two separate shape memory alloy wires could be provided and routed separately to each of the individual components. In either case, the same button 38 and the same switch 36 could be used to actuate the SMA wire coupled to each of the seal and the latch. Alternatively, if two separate SMA wires are provided, one for the seal and one for the latch, separate switches and/or separate buttons could be used to provide current to the SMA wires. Therefore, the exact electrical connections between the button(s), switch(es), and shape memory alloy wire(s) are not limiting on the scope of the present disclosure, as these can be connected in many different ways depending on the desired result. In one example, the same button 38 is used to both disengage the latch from the retaining mechanism and to lift the seal away from the cowl member to which it is not attached, thereby allowing for separation of the cowl members from one another with one push of a button.

As mentioned above, the shape memory alloy wires could be made of nickel titanium. In one example, the wires may be obtained from Dynalloy, Inc. of Irvine, Calif., which provides such wires under the trademark FLEXINOL®. It should be understood that the selection of wires is dependent on the type of seal and/or latch that is being actuated.

In the above description, certain terms have been used for brevity, clarity, and understanding. No unnecessary limitations are to be inferred therefrom beyond the requirement of the prior art because such terms are used for descriptive purposes and are intended to be broadly construed. The different assemblies described herein may be used alone or in combination with other assemblies. It is to be expected that various equivalents, alternatives and modifications are possible within the scope of the appended claims.

What is claimed is:

1. A cowl assembly for an outboard motor, the cowl assembly comprising: first and second cowl members configured to be joined together proximate respective first and second mating edges thereof, wherein the first mating edge has a relatively smaller perimeter than the second mating edge, such that the second mating edge overlaps the first mating edge;
   a fastening assembly including a latch coupled to one of the first and second cowl members, and a retaining mechanism coupled to the other of the first and second cowl members, the latch and the retaining mechanism configured to engage one another so as to fasten the first and second cowl members together;
   a seal coupled to the first cowl member and configured to form a fluid tight joint between the first and second cowl members, wherein the seal is coupled around the entire perimeter of the first mating edge;
   at least one shape memory alloy wire coupled to the seal, wherein the at least one shape memory alloy wire is embedded in and coextensive with an outer lip of the seal; and
   a switch configured to selectively provide electrical current to the at least one shape memory alloy wire so as to activate the at least one shape memory alloy wire;
   wherein activation of the at least one shape memory alloy wire causes disengagement of the seal from the second cowl member, to enable separation of the first cowl member from the second cowl member.

2. The cowl assembly of claim 1, wherein when no electrical current is provided to the at least one shape memory alloy wire, the outer lip of the seal extends radially outwardly from the first mating edge and engages the second cowl member proximate the overlapping second mating edge so as to seal a gap between the first mating edge and the second cowl member.

3. The cowl assembly of claim 2, wherein when electrical current is provided to the at least one shape memory alloy wire, the shape memory alloy wire contracts, thereby pulling the outer lip of the seal radially inwardly and out of engagement with the second cowl member.

4. The cowl assembly of claim 1, wherein a first end of the at least one shape memory alloy wire is also coupled to the latch, and wherein when electrical current is provided to the at least one shape memory alloy wire, the shape memory alloy wire one of expands and contracts as it is activated so as to actuate the fastening assembly and disengage the latch from the retaining mechanism.

5. The cowl assembly of claim 4, wherein a second, opposite end of the at least one shape memory alloy wire is coupled to an inner surface of the one of the first and second cowl members.

6. The cowl assembly of claim 4, wherein the at least one shape memory alloy wire is wound into a coil spring.

7. The cowl assembly of claim 1, further comprising a button that activates the switch.

8. The cowl assembly of claim 7, wherein the button is located proximate the fastening assembly.

9. The cowl assembly of claim 1, wherein the first cowl member is a bottom cowl member and the second cowl member is a top cowl member.

10. The cowl assembly of claim 1, wherein the at least one shape memory alloy wire comprises nickel-titanium.

11. The cowl assembly of claim 1, further comprising a first shape memory alloy wire embedded in the seal and a second shape memory alloy wire coupled to the latch, wherein the same switch is used to selectively provide electrical current through both the first and second shape memory alloy wires so as to activate the first and second shape memory alloy wires at the same time.

12. A cowl assembly for an outboard motor, the cowl assembly comprising:
   first and second cowl members configured to be joined together proximate respective first and second mating edges thereof, the first mating edge having a relatively smaller perimeter than the second mating edge, such that the second mating edge overlaps the first mating edge;
   a seal coupled around the entire perimeter of the first mating edge and configured to form a fluid tight joint between the first and second cowl members;
   a shape memory alloy wire coupled to the seal, wherein the shape memory alloy wire is embedded in and coextensive with an outer lip of the seal; and
   a switch configured to selectively provide electrical current to the shape memory alloy wire so as to activate the shape memory alloy wire;
   wherein when no electrical current is provided to the shape memory alloy wire, the outer lip of the seal extends radially outwardly from the first mating edge and engages the second cowl member proximate the overlapping second mating edge so as to seal a gap between the first mating edge and the second cowl member; and
   wherein when electrical current is provided to the shape memory alloy wire, the shape memory alloy wire contracts, thereby pulling the outer lip of the seal radially inwardly and out of engagement with the second cowl member.

13. The cowl assembly of claim 12, wherein pulling of the outer lip of the seal radially inwardly allows for placement of the second mating edge over the first mating edge without interference between the outer lip of the seal and the second mating edge.

14. The cowl assembly of claim 12, further comprising:
   a fastening assembly including a latch coupled to one of the first and second cowl members and a retaining mechanism coupled to the other of the first and second cowl members, the latch and the retaining mechanism configured to engage one another so as to fasten the first and second cowl members together;
   an additional shape memory alloy wire coupled to the latch; and
   an additional switch configured to selectively provide electrical current to the additional shape memory alloy wire so as to activate the additional shape memory alloy wire;
   wherein when the additional shape memory alloy wire is activated, it one of expands and contracts so as to actuate the fastening assembly and one of engage and disengage the latch with respect to the retaining mechanism.

15. The cowl assembly of claim 12, wherein the first cowl member is a bottom cowl member and the second cowl member is a top cowl member.

16. The cowl assembly of claim 12, wherein the shape memory alloy wire comprises nickel-titanium.

\* \* \* \* \*